Aug. 20, 1929.   J. J. EYRE   1,725,626
TIRE CHAIN TOOL
Filed April 22, 1927
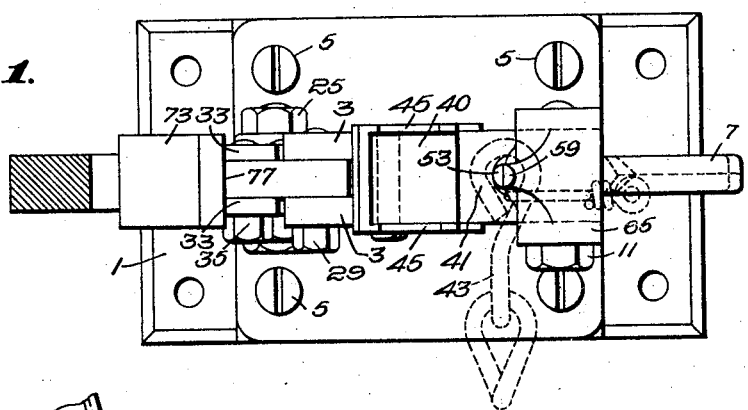
Fig.1.
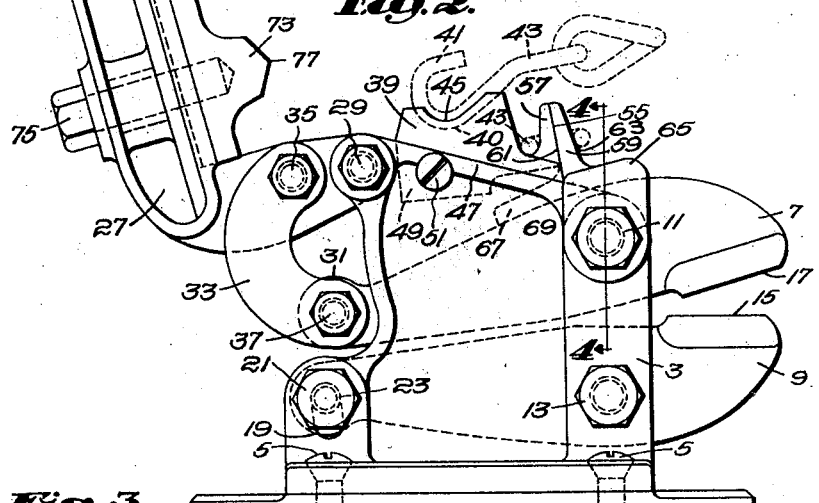
Fig.2.
Fig.3.
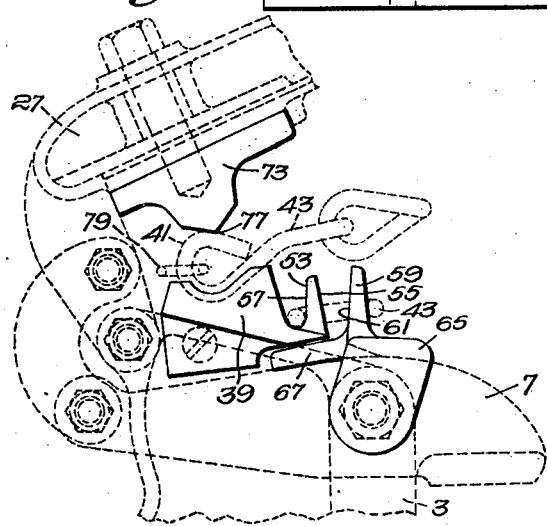
Fig.4.
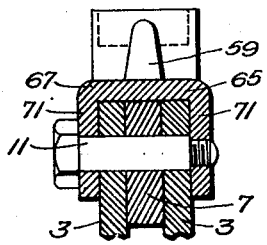
Inventor:
John J. Eyre Patented Aug. 20, 1929.

1,725,626

UNITED STATES PATENT OFFICE.

JOHN J. EYRE, OF SAUGUS, MASSACHUSETTS, ASSIGNOR TO H. K. PORTER, INC., OF EVERETT, MASSACHUSETTS, A CORPORATION OF MASSACHUSETTS.

TIRE-CHAIN TOOL.

Application filed April 22, 1927. Serial No. 185,821.

My invention aims to provide an improved tire chain tool, and in the accompanying drawings is shown an illustrative embodiment of the invention; wherein Fig. 1 is a plan view of the tool;

Fig. 2 is a side elevation thereof with parts of the work shown dotted;

Fig. 3 is a detail side elevation of the link manipulating elements in link engaging positions, parts of the tool being broken away; and Fig. 4 is a vertical section taken on the line 4—4 of Fig. 2.

In the particular embodiment of my invention selected for purposes of illustration and shown in the drawings, the supporting frame for the operative parts comprises a base 1 upon which are angular side members 3 secured in spaced relation to said base by screws 5.

Arranged between the side members and supported thereby on both sides are cooperating cutters 7 and 9 at least one of which, herein the cutter 7, is pivoted upon a stud 11 which engages both side members.

The other cutter 9 is relatively non-movable, with the possible exception of a slight pivotal movement about a pivotal stud 13, for the purpose of adjusting the cutting edge 15 of that cutter relatively to the cutting edge 17 of the cutter 7.

To provide for the aforesaid adjustment the side members 3 are slotted at 19 and through these slots and through a hole 23 formed in the tail of the cutter 9 a bolt 21 is passed, said bolt having a nut 25 at one end securely to clamp the tail of said cutter in the desired position within the range of said slots. The slots 19 follow an arc swung from the axis of the pivotal screw 13, whereby a limited swinging movement of said tail about said axis will be permitted.

The movable cutter 7 is herein operated by an operating lever 27 pivoted upon a screw 29 between the upper portions of the side supporting members 3. The lever 27 is operatively connected with the tail 31 of said movable cutter by means of arcuate links 33 arranged one upon each side of said lever and the tail end of said movable cutter and pivotally connected with said lever by a screw 35 and with said cutter by a screw 37. By making said links arcuate with their concave edges toward the pivot (29) it will be possible during the functioning operations of the cutter to move the axes of the pivotal studs 29, 35 and 37 approximately into alignment and thereby exert a maximum pressure upon the cutting edges and still retain the pivots 29 and 35 in close relation.

One important purpose of the tool of this invention is the making of chains, particularly such as are used as cross links for tire chains. This makes it desirable to provide cutters for cutting the chain into short lengths to fit the sizes of tire shoes but in addition to the cutting of chain links the end links or hooks have to be opened and closed both for attachment to the short chain lengths and also for attaching the hooks to the circumferential chains of the usual tire chain, and in order that the tool may be useful in all operations necessary to form the short lengths and attach them to the circumferential links, link manipulating instrumentalities have been arranged in close association with the cutters 7 and 9 and these link manipulating elements are further positioned so as to be operated simultaneously with said cutters and by means of the same operating lever, thus reducing the number of movable parts necessary to accomplish the aforesaid results and at the same time producing a very compact and powerful instrument for such purposes.

To the above end the chain link manipulating elements are carried in part by the supporting members 3 and in part by the operating lever 27. In the present example the parts carried by the supporting members 3 include an anvil 39 having an upper concaved anvil surface 40 substantially conforming to a portion at least of the eye 41 of the hook 43 shown in dotted lines in Figs. 2 and 3 of the drawing. Flanges 45 are formed at opposite edges of the anvil to position the hooks laterally upon said concaved anvil surface.

The under surface of the anvil 39 is inclined at 47 and substantially conforms to the upper contours of the side members 3, a central depending tongue 49 being formed thereon to fit between said members 3 and definitely position the anvil laterally on said supporting members. A screw 51 extends through the members 3 and depending tongue 49 to secure said anvil in place on the supporting members.

An upstanding tapered horn 53 is formed in front of and herein integral with the anvil 39 and constitutes one of a pair of link spreading elements. The element 53 has a flat inner face 55 and a substantially convex outer face 57 and this element cooperates with a second link spreading element 59 having an inner flat face 61 which at times lies contiguous to the flat face 55 of the first mentioned link spreading element. The outer surface 63 of said second link spreading element is also convex and slightly tapered, so that when said link spreading elements are in contact as they normally are and shown in Figs. 1 and 2 a substantially round, tapered, upwardly directed loop entering element will be provided which will be capable of penetrating a substantial distance the closed eye 41 of the chain hook 43.

The loop spreading element 53 is relatively stationary, being formed integral with the anvil 39 and secured to the stationary rigid part of the frame of the device. The other link spreading element 59 is arranged for movement relatively to the member 53, herein by being operatively connected indirectly at least with the operating lever 27 so that when said lever is moved by the operator in one direction the element 59 will be moved laterally away from the relatively stationary element 53 and if the hook of a link has been placed upon said elements, as shown in Figs. 1 and 2, the arms of said hook will be separated or its eye opened to allow said hook to be removed from or hooked over another link (see Fig. 3).

In order to simplify the construction of the device and make it readily adaptable either to use as a cutting tool alone or as a combined cutting tool and link manipulating device, the movable member 59 of the link spreading elements is shown supported by a yoke 65 having a body 67 shaped substantially to conform to the upper curved edge 69 of the movable cutter 7, whereupon any movement of said movable cutter will create a like movement of said element 59. The yoke 65 includes ears 71 which depend from the body 67 and straddle the upper portion of the supporting elements 3 and are secured in pivotal relation to the frame or supporting members 3, herein by the screw 11 constituting the pivot for the movable cutter 7.

By reason of the above arrangement the yoke 65 will be free to swing with the movable member 7 when the latter is rocked by the operating lever 27 and desirably this swinging movement takes place when the movable cutter 7 is moved to its cutting position, as this movement of the operating lever is capable of applying far more pressure to the movable elements than would be the reverse or cutter retracting movement of said lever.

Secured to the under side of the operating lever 27 is a hook closing member 73 secured, herein by a screw 75, to said lever 27 in a position wherein the operative edge 77 of the closing member will engage the upper free ends of the wire of the hooks 43 constituting the eye 41, when said lever is moved to its cutter operating positions, see Fig. 3, and cause said eye to be closed over one of the links 79 of the circumferential tire chain.

The link closing members 39 and 73, the link spreading elements 53 and 49, the cutters 7 and 9 and the operating lever 27 are herein all arranged substantially symmetrical to a common vertical plane, and being supported on both sides by the frame members 3 there will be little if any tendency on the part of said members to twist or cramp during their various operations.

It is to be understood that the invention is not limited to the specific embodiment shown herein.

Claims:

1. A tire chain tool comprising cooperating cutters; supporting means for said cutters; and means to operate at least one of said cutters; in combination with link manipulating elements including an anvil and a link spreading element carried by said cutter supporting means, a link closing element secured to and movable with said cutter operating member into engagement with said anvil and a movable link spreading element operatively engaging the movable cutter and operated thereby to spread a link.

2. In combination, a pair of cooperating work members, a supporting frame for said work members, an operating lever pivotally mounted upon said supporting frame and connected with at least one of said work members to operate the latter, and a pair of cooperating link closing members one of which is secured to said operating lever in proximity to its pivot, the other link closing member being carried by said supporting frame in cooperative relation to the link closing member carried by said operating lever, said link closing members being arranged to function to close a link during the movement of said operating lever to function said work members.

3. In combination, a pair of cooperating relatively pivoted work members, a supporting frame for said work members, an operating lever pivotally mounted upon said supporting frame and operatively connected with at least one of said work members, link manipulating members including a hook closing anvil and a link opening element rigidly mounted upon said supporting frame, a movable link closing member carried by said operating lever and a movable link opening member pivoted upon said supporting frame and having operative engagement with said movable work member whereby a single operation of said operating lever will effect the closing of a link and the opening of a link.

4. In combination, a pair of cooperating relatively pivoted work members, a supporting frame for said work members, an operating lever pivotally mounted upon said supporting frame and operatively connected with at least one of said work members, link manipulating members including a hook closing anvil and a link opening element rigidly mounted upon said supporting frame, a movable link closing member carried by said operating lever and a movable link opening member pivoted upon said supporting frame and having operative engagement with said movable work member whereby the operation of said operating lever to function said work members will effect the closing of a link and the opening of a link.

5. In combination, a pair of cooperating relatively pivoted work members, a supporting frame for said work members, an operating lever pivotally mounted upon said supporting frame and operatively connected with at least one of said work members, link manipulating members including a hook closing anvil and a link opening element rigidly mounted upon said supporting frame, a movable link closing member carried by said operating lever and a movable link opening member pivoted upon said supporting frame and having operative engagement with said movable work member whereby the operation of said operating lever to function said work members will effect the simultaneous opening of one link and the closing of another link.

6. A tire-chain tool comprising cooperating cutting members, a supporting frame for said cutting members, an operating member pivoted upon said supporting frame, a link connecting said operating member with at least one of said cutting members and constituting with said operating member a toggle, link closing elements including a stationary part carried by said supporting frame and a part carried by said operating member, link spreading elements including a stationary part carried by said supporting frame and a movable part arranged to be operated by said operating member to spread a link when the latter member is operating said toggle to function said cutting members and said movable link closing element to close a link.

In testimony whereof, I have signed my name to this specification.

JOHN J. EYRE.